United States Patent [19]

Ikari

[11] 4,437,750
[45] Mar. 20, 1984

[54] ADJUSTABLE DIOPTER TYPE FINDER OPTICAL SYSTEM

[75] Inventor: Kazuo Ikari, Hachiooji, Japan

[73] Assignee: Olympus Optical Co., Ltd., Tokyo, Japan

[21] Appl. No.: 383,840

[22] Filed: Jun. 1, 1982

[30] Foreign Application Priority Data

Jun. 8, 1981 [JP] Japan .................................. 56-87736

[51] Int. Cl.³ ............................................ G03B 19/12
[52] U.S. Cl. ..................................... 354/155; 350/410
[58] Field of Search ................ 354/155, 219, 222–225; 350/410

[56] References Cited

U.S. PATENT DOCUMENTS 4,206,988 6/1980 Miyamoto et al. ............. 354/219 X
4,217,048 8/1980 Egawa .

Primary Examiner—John Gonzales
Attorney, Agent, or Firm—Cushman, Darby & Cushman

[57] ABSTRACT

An adjustable diopter type finder optical system comprising an eyepiece comprising a first lens component having negative refractive power and a second lens component having positive refractive power, the finder optical system being arranged to make diopter adjustment by moving both of the first and second lens components in the same direction along the optical axis by varying the distance between those lens components and arranged so that variation of magnification and fluctuation of aberrations are small.

4 Claims, 5 Drawing Figures

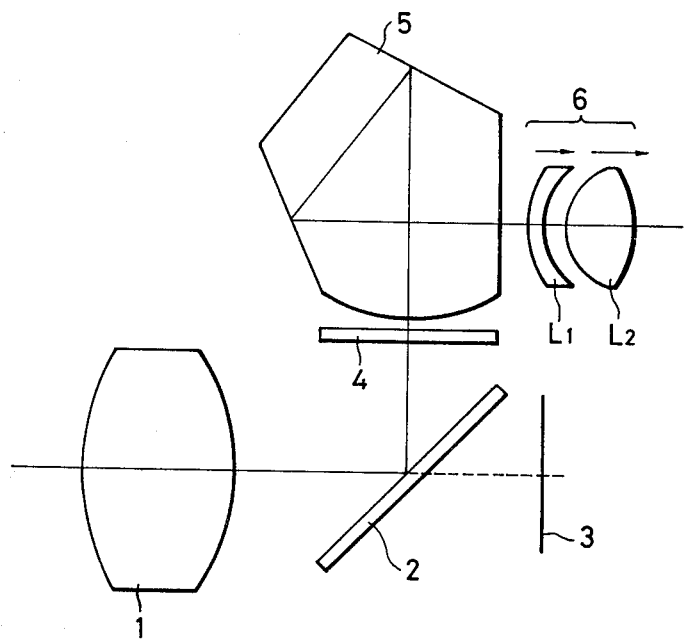
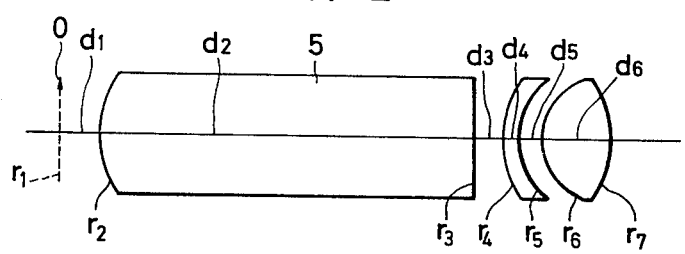

FIG. 3
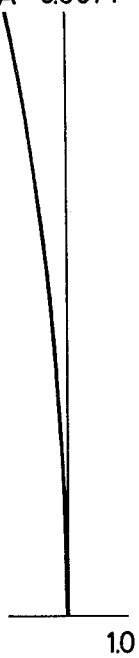
SPHERICAL
ABERRATION
NA=0.0014
1.0
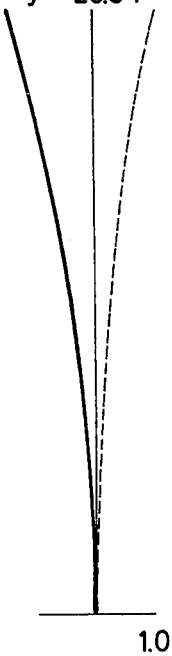
ASTIGMATISM
y = 20.54
1.0
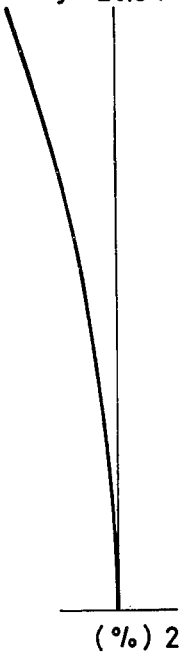
DISTORTION
y = 20.54
(%) 2

FIG. 4
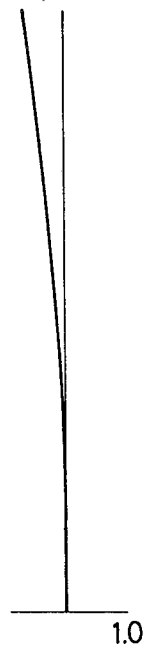
SPHERICAL ABERRATION
NA=0.0016
1.0
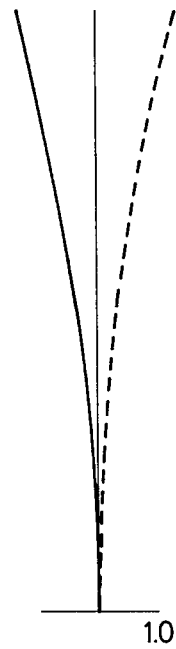
ASTIGMATISM
y=20.54
1.0
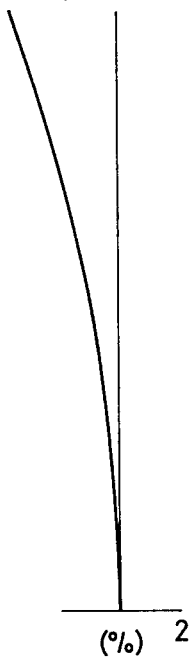
DISTORTION
y=20.54
(%) 2

FIG. 5
SPHERICAL
ABERRATION
NA=0.0062
1.0
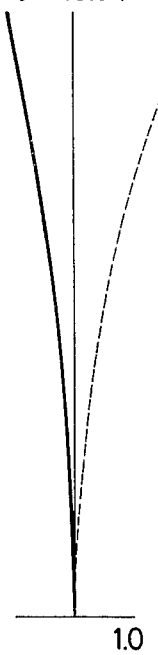
ASTIGMATISM
y=20.54
1.0
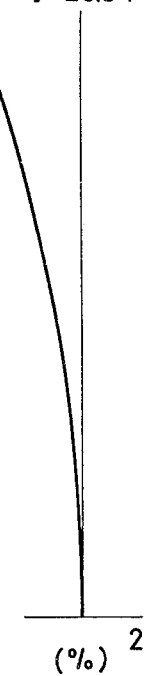
DISTORTION
y=20.54
2 (%)

ADJUSTABLE DIOPTER TYPE FINDER OPTICAL SYSTEM

BACKGROUND OF THE INVENTION (a) Field of the Invention

The present invention relates to an adjustable diopter type finder optical system.

(b) Description of the Prior Art

Generally, with finders of optical devices, binoculars, microscopes, etc., an image formed at a predetermined position by the optical system is observe through an eyepiece. When, at that time, the image is formed at a position out of the range wherein the image can be seen by the adjusting function of eye, it is difficult to observe the image. To observe the image formed at such position, it is necessary to use a diopter adjusting means which enables to adjust the image to a position where it can be seen easily, according to the adjusting ability of eye. For example, in a known finder optical system for a single-lens reflex camera provided with the above-mentioned diopter adjusting means, it is so arranged that the eyepiece constituting the optical system can be moved forward and backward in respect to the image formed by the finder (finder image). However, in the known finders of single-lens reflex cameras of 35 mm format, a pentagonal prism exists between the finder and eyepiece and, therefore, the focal length $f_e$ of the eyepiece necessarily becomes large, i.e., about 60 mm. Consequently, to obtain the desired variation of diopter, the movement amount of the eyepiece becomes large. The movement amount $\Delta$ of the eyepiece per 1D (diopter) is given by the following formula.

$$\Delta = (f_e^2/1000)$$

Therefore, to vary the diopter by 2D, it is necessary to move the eyepiece by about 7 mm. However, in case of single-lens reflex cameras of 35 mm format, the eyepiece should be arranged in a very limited space behind the pentagonal prism and, therefore, it is not possible to ensure a sufficient space which enables to move the eyepiece by a large amount as described in the above.

To obtain the desired variation of diopter by a small movement amount of eyepiece, it is known to arrange a finder optical system so that its eyepiece comprises two lens components, i.e., a negative lens and positive lens, and the diopter is adjusted by keeping either one of the negative lens and positive lens fixed and moving the other one only. With the above-mentioned optical system, it is possible to obtain a large variation of diopter by a very small movement amount by arranging that the focal length of the movable lens in the eyepiece is made shorter than the focal length of the eyepiece as a whole. However, to obtain the predetermined value of focal length of the eyepiece as a whole with such eyepiece that the focal length of the movable lens is made shorter than the focal length of the eyepiece as a whole, the focal length of the fixed lens should be also made short. When a lens with a short focal length is moved as described in the above, disadvantages are caused as explained below.

A first disadvantage is that the magnification of the finder optical system varies according to the movement of the movable lens. For example, for single-lens reflex cameras, the magnification of the finder optical system is generally expressed by the magnification $\beta$ of the telescope formed by the photographing lens system and eyepiece as shown by the following formula, where reference symbol $f_T$ represents the focal length of the photographing lens system.

$$\beta = (f_e/f_T)$$

Therefore, when the diopter is adjusted by moving the eyepiece as a whole, the magnification of the finder optical system does not change, even when diopter adjustment is made, because $f_e$ and $f_T$ do not change. When, however, the eyepiece comprises two lens components, i.e., a negative lens and positive lens, and the diopter is adjusted by moving one of those lenses, the airspace between the two lenses varies at the time of diopter adjustment and, consequently, the focal length $f_e$ of the eyepiece varies. Therefore, when the focal length $f_T$ of the photographing lens system does not vary, the magnification of the finder optical system varies according to adjustment of diopter. Variation of $f_e$ becomes larger when the focal lengths of the two lenses are shorter and when the variation in the relative positions of the two lenses is larger.

A second disadvantage is that aberrations of the eyepiece fluctuate according to the movement of the movable lens. For a lens system with simple lens configuration such as an eyepiece, aberrations of the eyepiece as a whole are generally made small by arranging so that aberrations caused by the negative lens are cancelled by the positive lens. The above-mentioned offsetting of aberrations of one lens by the other lens is possible only when the two lenses are kept in the predetermined relative positions. If the relative positions become different, aberrations of one lens cannot be satisfactorily offset by the other lens and, consequently, aberrations of the eyepiece as a whole become unfavourable. In other words, when one lens is moved for adjustment of diopter, aberrations of the eyepiece fluctuate. This fluctuation of aberrations also become larger when the focal lengths of respective lenses are shorter and when the variation in the relative positions of those lenses is larger.

SUMMARY OF THE INVENTION

It is, therefore, a primary object of the present invention to provide an adjustable diopter type finder optical system comprising an eyepiece, which comprises a first lens component having negative refractive power and a second lens component having positive refractive power, and arranged to adjust the diopter by moving both of the first and second lens components in the same direction along the optical axis by varying the distance between the first and second lens components.

In the finder optical system according to the present invention, the two lens components are moved in the same direction along the optical axis by varying the distance between those two lens components as described in the above. Therefore, variation in the distance between the two lens components is smaller compared with the known optical system of which the diopter is varied by moving one lens component only. Consequently, variation in the focal length $f_e$ of the eyepiece at the time of diopter adjustment is small and it is possible to make the variation in the magnification of the finder optical system and fluctuation of aberrations small. In the movements of the lens components at the time of diopter adjustment in the optical system according to the present invention, the movement of the eyepiece as a whole is combined with the movement of one movable lens component. That is, in the optical system according to the present invention, the diopter is adjusted by moving the first and second lens components in the same direction by different movement amounts. Consequently, the positions of the two lens components after the adjustment become the same as the positions of those lens components attained when the two lens components are integrally moved at first and, then, only one lens component is further moved so that the distance between the two lens components is varied. Therefore, the effect of diopter adjustment in the optical system according to the present invention is somewhat smaller than the case that the diopter is adjusted by moving only one lens component but is larger than the case that the diopter is adjusted by moving the eyepiece as a whole, and the optical system according to the present invention enables to obtain the desired large amount of diopter adjustment by comparatively small movement amounts of lens components.

To make the variation in the diopter larger, it is preferable to make the focal lengths of respective lens components shorter. However, for correction of aberrations, manufacture of lenses, etc., it is preferable to make the focal lengths of respective lens components longer. Therefore, at the time of the design of the optical system according to the present invention, it is necessary to mutually balance the above-mentioned requirements which are contrary to each other. For this purpose, it is preferable to arrange the optical system so that it fulfills the following conditions, where reference symbol $f_1$ represents the focal length of the first lens component and reference symbol $f_2$ represents the focal length of the second lens component.

$$0.6 < \frac{|f_1|}{f_e} < 1.2$$

$$0.4 < \frac{f_2}{f_e} < 0.8$$

By making $|f_1|$ and $f_2$ smaller than the upper limits of the above-mentioned conditions, it is possible to obtain large variation of diopter. By making $|f_1|$ and $f_2$ larger than the lower limit of the above-mentioned conditions, it becomes advantageous for correction of aberrations, especially for correction of astigmatism.

BRIEF DESCRIPTION OF THE DRAWINGS

FIG. 1 shows a sectional view illustrating the finder optical system according to the present invention applied to a single-lens reflex camera;

FIG. 2 shows a sectional view of an embodiment of the finder optical system according to the present invention; and FIGS. 3, 4 and 5 respectively show graphs illustrating the aberration curves of the above-mentioned embodiment.

DETAILED DESCRIPTION OF THE PREFERRED EMBODIMENT

FIG. 1 shows a sectional view illustrating the finder optical system according to the present invention applied to a single-lens reflex camera. Numeral 1 designates a photographing lens system which forms an image of an object, which is not shown, onto the film 3. Besides, by arranging a movable mirror 2 in the position shown in the figure, said object is imaged onto a focusing glass arranged in the position conjugate with the film 3. The image formed on the focusing glass 4 is observed through a pentagonal prism 5 and eyepiece 6. The eyepiece 6 comprises a first lens component $L_1$ and second lens component $L_2$ in the order from the side closer to the object (here, the image of the object on the focusing glass 4), the first lens component $L_1$ being a negative meniscus lens convex toward the object side, the second lens component $L_2$ being a biconvex lens. At the time of diopter adjustment, the first lens component $L_1$ and the second lens component $L_2$ are moved in the same direction with different movement amounts. When adjusting the diopter toward the "plus" side in the above-mentioned case, both of the lens components $L_1$ and $L_2$ are moved in the direction shown by the arrow marks in FIG. 1. When adjusting the diopter toward the "minus" side, the lens components $L_1$ and $L_2$ are moved in the direction opposite to the arrow marks. When moving in either direction, the movement amount of the lens component $L_2$ is larger than the movement amount of the lens component $L_1$. Therefore, when the position of 0D (zero diopter) is used as the reference position, the distance between the lens components $L_1$ and $L_2$ becomes larger when the diopter is adjusted toward the plus side and said distance becomes smaller when the diopter is adjusted toward the minus side.

An embodiment of the finder optical system according to the present invention is arranged as shown in FIG. 2 and has numerical data as shown below.

| | | | |
|---|---|---|---|
| $r_1 = \infty$ | | | |
| | $d_1 = 1.17$ | | |
| $r_2 = 140.0$ | | | |
| | $d_2 = 79.65$ | $n_1 = 1.51633$ | $\nu_1 = 64.15$ |
| $r_3 = \infty$ | | | |
| | $d_3 = $ variable | | |
| $r_4 = 32.827$ | | | |
| | $d_4 = 1.5$ | $n_2 = 1.72825$ | $\nu_2 = 28.46$ |
| $r_5 = 18.512$ | | | |
| | $d_5 = $ variable | | |
| $r_6 = 18.827$ | | | |
| | $d_6 = 5.0$ | $n_3 = 1.62041$ | $\nu_3 = 60.27$ |
| $r_7 = -2466.124$ | | | |
| $f_1 = -60.981$ | | $f_2 = 30.139$ | |
| $f_e = 59.594$ | | | |

In the data shown in the above, reference symbols $r_1$ through $r_7$ respectively represent radii of curvature of respective surfaces, i.e., reference symbol $r_1$ represents the radius of curvature of the focusing surface O of the focusing glass 4, reference symbols $r_2$ and $r_3$ respectively represent radii of curvature of the entrance surface and exit surface of the pentagonal prism, and reference symbols $r_4$ through $r_7$ respectively represent radii of curvature of the lens components constituting the eyepiece. Reference symbols $d_1$ through $d_6$ respectively represent distances between respective surfaces, reference symbols $n_1$, $n_2$ and $n_3$ respectively represent refractive indices of the pentagonal prism and respective lens components constituting the eyepiece, and reference symbols $\nu_1$, $\nu_2$ and $\nu_3$ respectively represent Abbe's numbers of the pentagonal prism and respective lens components constituting the eyepiece.

When the first lens component $L_1$ and the second lens component $L_2$ of the above-mentioned embodiment are moved values of the focal length $f_e$ of the eyepiece, diopter, and magnification of the finder optical system in case that the focal length of the photographing lens system is 50 mm become as given in Table.

TABLE

| $d_3$ | $d_5$ | $f_e$ | diopter | magnification |
|---|---|---|---|---|
| 1.4 | 2.2 | 57.711 | +0.462 | 0.867 |
| 1.0 | 1.4 | 58.462 | −0.537 | 0.855 |
| 0.4 | 0.2 | 59.633 | −2.075 | 0.839 |

FIGS. 3 through 5 show graphs of aberration curves of the above-mentioned embodiment. FIG. 3 shows aberration curves when the diopter is 0.462D given in Table, FIG. 4 shows the aberration curves when the diopter is −0.537D, and FIG. 5 shows aberration curves when the diopter is −2.075D. These graphs of aberration curves show aberrations when the distance from the focusing surface O to the eye point is 105 mm, pupil diameter is 4 mm, and rays enter the eyepiece from the pupil side and form an image on the focusing surface O.

As it is evident from Table, in case of this embodiment, the movement amount of the second lens component $L_2$ required for varying the diopter from −2.075D to +0.462D is 3 mm, and variation of magnification of the finder optical system caused at that time is 3.3%. On the other hand, when diopter adjustment for the same range as above is made by using an eyepiece with the same optical system as this embodiment but by keeping the first lens component $L_1$ fixed and moving the second lens component $L_2$ only, the movement amount of the second lens component becomes 2.3 mm and variation of magnification of the finder optical system becomes 4.2%. When diopter adjustment for the same range as above is made by integrally moving the first and second lens components of the same eyepiece, the movement amount of the lens components becomes about 7 mm. As described in the above, with the finder optical system according to the present invention, the amounts of lens component movements required for diopter adjustment are slightly larger than the case that either of the two lens components is moved but are considerably smaller than the case that both lens components are moved integrally. Besides, with the finder optical system according to the present invention, variation of magnification of the finder optical system is smaller than the case that only one of the two lens components is moved. Besides, as it is evident from FIGS. 3 through 5, variation of aberrations to be caused by diopter adjustment is made extremely small.

I claim:

1. An adjustable diopter type finder optical system comprising an eyepiece comprising a first lens component having negative refractive power and a second lens component having positive refractive power, said finder optical system being arranged to make diopter adjustment by moving both of said first lens component and said second lens component in the same direction along the optical axis both with different amounts of movements.

2. An adjustable diopter type finder optical system according to claim 1, which satisfies the following conditions, where reference symbol $f_e$ represents the focal length of said eyepiece, reference symbol $f_1$ represents the focal length of said first lens component and reference symblol $f_2$ represents the focal length of said second lens component $$0.6 < \frac{|f_1|}{f_e} < 1.2$$

$$0.4 < \frac{f_2}{f_e} < 0.8$$

3. An adjustable diopter type finder optical system according to claim 1
said adjustable diopter type finder optical system being arranged to be used in combination with an optical system, which forms an image of an object to be observed and is arranged in front of said adjustable diopter type finder optical system, said adjustable diopter finder optical system further comprising a pentagonal prism having a convex entrance surface and arranged between the image position of the object and said eyepiece.

4. An adjustable diopter type finder optical system according to claim 3, in which said first lens component is a negative meniscus lens convex toward the pentagonal prism side and said second lens component is a biconvex lens, said finder optical system having the following numerical data:

```
r1 = ∞
    d1 = 1.17
r2 = 140.0
    d2 = 79.65      n1 = 1.51633    ν1 = 64.15
r3 = ∞
    d3 = variable
r4 = 32.827
    d4 = 1.5        n2 = 1.72825    ν2 = 28.46
r5 = 18.512
    d5 = variable
r6 = 18.827
    d6 = 5.0        n3 = 1.62041    ν3 = 60.27
r7 = −2466.124
    f1 = −60.981            f2 = 30.139
    fe = 59.594
``` wherein reference symbols $r_1$ through $r_7$ respectively represent radii of curvature of respective surfaces ($r_1$ corresponds to the image surface), reference symbols $d_1$ through $d_6$ respectively represent distances between respective surfaces, reference symbols $n_1$, $n_2$ and $n_3$ respectively represent refractive indices of the pentagonal prism and respective lens components constituting the eyepiece, and reference symbols $\nu_1$, $\nu_2$ and $\nu_3$ respectively represent Abbe's numbers of the pentagonal prism and respective lens components constituting the eyepiece.

* * * * *